(12) United States Patent
Shirasaka et al.

(10) Patent No.: US 8,432,674 B2
(45) Date of Patent: Apr. 30, 2013

(54) ELECTRONIC DEVICE

(75) Inventors: Hideo Shirasaka, Hamura (JP); Tetsuhiko Fukazawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/290,805

(22) Filed: Nov. 7, 2011

(65) Prior Publication Data

US 2012/0206895 A1 Aug. 16, 2012

(30) Foreign Application Priority Data

Feb. 14, 2011 (JP) ................. 2011-029114

(51) Int. Cl.
*G06F 1/16* (2006.01)

(52) U.S. Cl.
USPC ............ 361/679.21; 361/679.22; 361/679.27; 349/58

(58) Field of Classification Search ............... 361/679.21
See application file for complete search history.

(56) References Cited

U.S. PATENT DOCUMENTS

| 5,905,550 | A | 5/1999 | Ohgami et al. |
|---|---|---|---|
| 6,144,278 | A | 11/2000 | Nishida et al. |
| 6,437,673 | B1 | 8/2002 | Nishida et al. |
| 6,989,986 | B2 | 1/2006 | Kumagai et al. |
| 7,606,023 | B2 | 10/2009 | Konno et al. |
| 7,652,729 | B2 | 1/2010 | Minaguchi et al. |
| 7,697,273 | B2 * | 4/2010 | Kawano .................. 361/679.21 |
| 8,094,442 | B2 * | 1/2012 | Sugawara ................ 361/679.21 |
| 2004/0156168 | A1 * | 8/2004 | LeVasseur et al. ............ 361/681 |
| 2004/0184224 | A1 | 9/2004 | Kumagai et al. |
| 2005/0105013 | A1 * | 5/2005 | Nakagawa et al. .............. 349/58 |
| 2006/0066769 | A1 | 3/2006 | Minaguchi et al. |
| 2007/0023733 | A1 | 2/2007 | Ooe et al. |
| 2009/0237586 | A1 * | 9/2009 | Han et al. ......................... 349/58 |
| 2009/0244437 | A1 * | 10/2009 | Yamaguchi et al. ............ 349/60 |
| 2012/0162569 | A1 * | 6/2012 | Sekiguchi et al. .............. 349/58 |

FOREIGN PATENT DOCUMENTS

| JP | H09-297542 | A2 | 11/1997 |
|---|---|---|---|
| JP | 11-204958 | | 7/1999 |
| JP | 2006-099242 | | 4/2006 |
| JP | 2007-034939 | A2 | 2/2007 |
| JP | 2007-328613 | A2 | 12/2007 |
| JP | 2008-047144 | | 2/2008 |
| JP | 2008-281644 | A2 | 11/2008 |
| JP | 2010-282493 | A2 | 12/2010 |

OTHER PUBLICATIONS

Notice of Rejection for Japanese Patent Application JP 2011-029114 mailed May 8, 2012.
Notice of Rejection for Japanese Patent Application JP 2011-029114 mailed Jan. 31, 2012.

* cited by examiner

*Primary Examiner* — Anthony Q Edwards
(74) *Attorney, Agent, or Firm* — Knobbe Martens Olson & Bear LLP

(57) ABSTRACT

According to one first embodiment, an electronic device includes a display module, a housing, an engagement portion, and a buffer. The display module includes a display screen, a side portion located at a periphery of the display screen, and a protrusion protruding from the side portion. The housing houses the display module such that the display screen is exposed. The engagement portion is provided to the housing to engage with the protrusion. The buffer is provided to the protrusion and is deformed by an engagement between the protrusion and the engagement portion.

10 Claims, 7 Drawing Sheets

ELECTRONIC DEVICE

CROSS-REFERENCE TO RELATED APPLICATIONS

This application is based upon and claims the benefit of priority from Japanese Patent Application No. 2011-029114, filed on Feb. 14, 2011, the entire contents of which are incorporated herein by reference.

FIELD

Embodiments described herein relate generally to an electronic device.

BACKGROUND

There have been known electronic devices having a display panel that is supported by a rib and an elastic member provided in the housing. In such an electronic device, a shock acting on the display panel when the electronic device falls is absorbed by the elastic member located between the display panel and the rib.

This type of electronic device is required to have a structure capable of effectively absorbing a shock.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
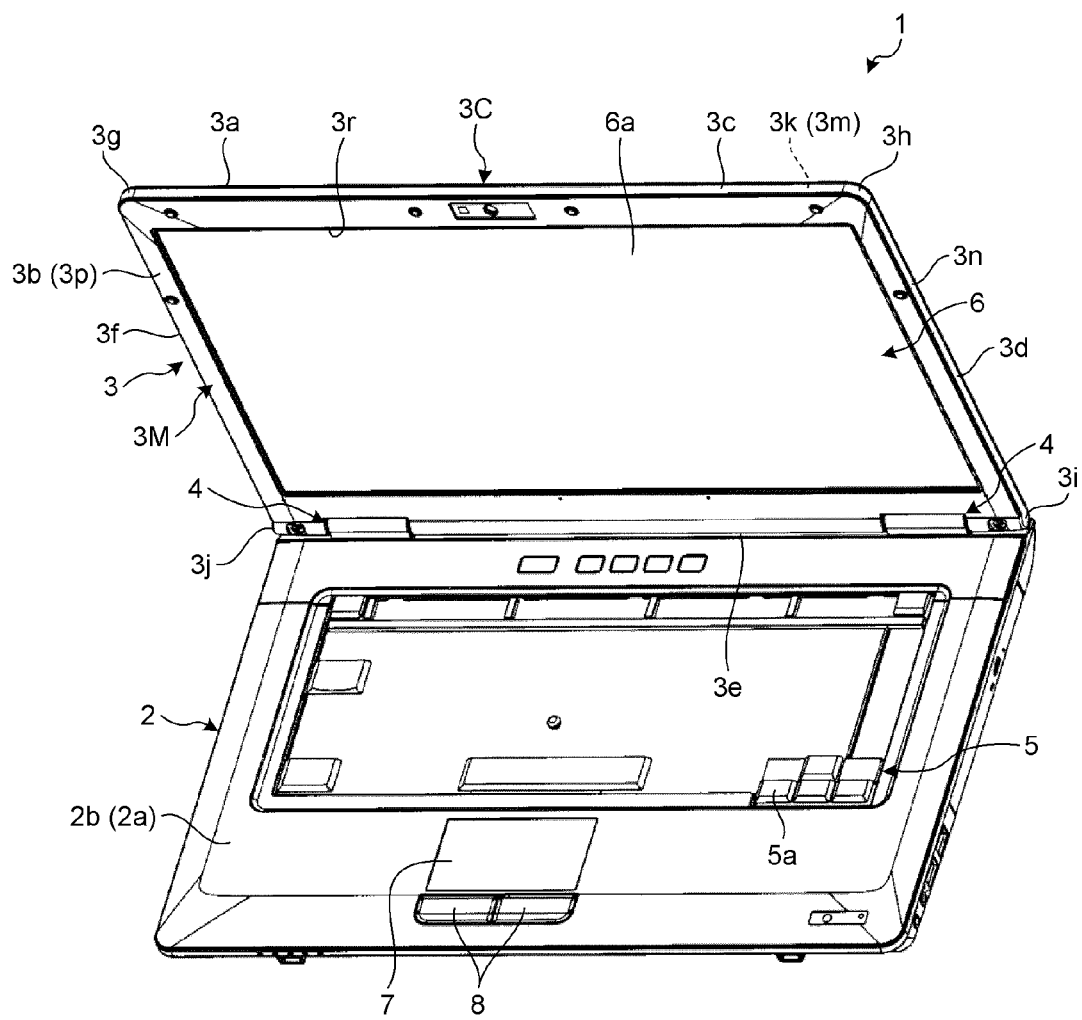
FIG. 1 is an exemplary perspective view of an electronic device according to a first embodiment.
Figure 1:
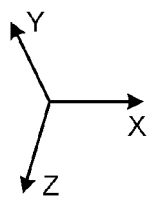

In general, according to one embodiment, an electronic device comprises a display module, a housing, an engagement portion, and a buffer. The display module comprises a display screen, a side portion located at the periphery of the display screen, and a protrusion protruding from the side portion. The housing is configured to house the display module such that the display screen is exposed. The engagement portion is provided to the housing and is configured to engage with the protrusion. The buffer is provided to the protrusion and is configured to be deformed by an engagement between the protrusion and the engagement portion.

In exemplary embodiments and modifications thereof described below, like elements are designated by like reference numerals, and their description is not repeated.

As illustrated in FIG. 1, an electronic device 1 of an first embodiment is, for example, a notebook personal computer (PC). The electronic device 1 comprises a flat rectangular first unit 2 and a flat rectangular second unit 3. The first unit 2 and the second unit 3 are connected by a hinge mechanism 4 to be relatively rotatable between an open position illustrated in FIG. 1 and a closed position (not illustrated). In the following, for the sake of convenience, directions are defined as follows: X direction indicates the width direction (horizontal direction) of the second unit 3; Y direction indicates the direction of an end of the second unit 3; and Z direction indicates the thickness direction of the second unit 3. The X, Y, and Z directions are perpendicular to one another.

The first unit 2 is provided with a keyboard 5, a pointing device 7, click buttons 8, and the like as input devices, which are exposed on a front surface 2b as the outer surface of a housing 2a of the first unit 2. The second unit 3 is provided with a display panel 6 such as a liquid crystal display (LCD) panel as a display module (display device). The display panel 6 comprises a display screen 6a which is exposed on a front surface 3b as the outer surface of a housing 3a of the second unit 3. In the open position, the keyboard 5, the display panel 6, and the like are exposed so that the user can use them. On the other hand, in the closed position, the front surface 2b closely faces the front surface 3b, and the keyboard 5, the display panel 6, the pointing device 7, the click buttons 8, and the like are hidden between the housings 2a and 3a. In FIG. 1, only keys 5a of the keyboard 5 are indicated.

Figure 2:
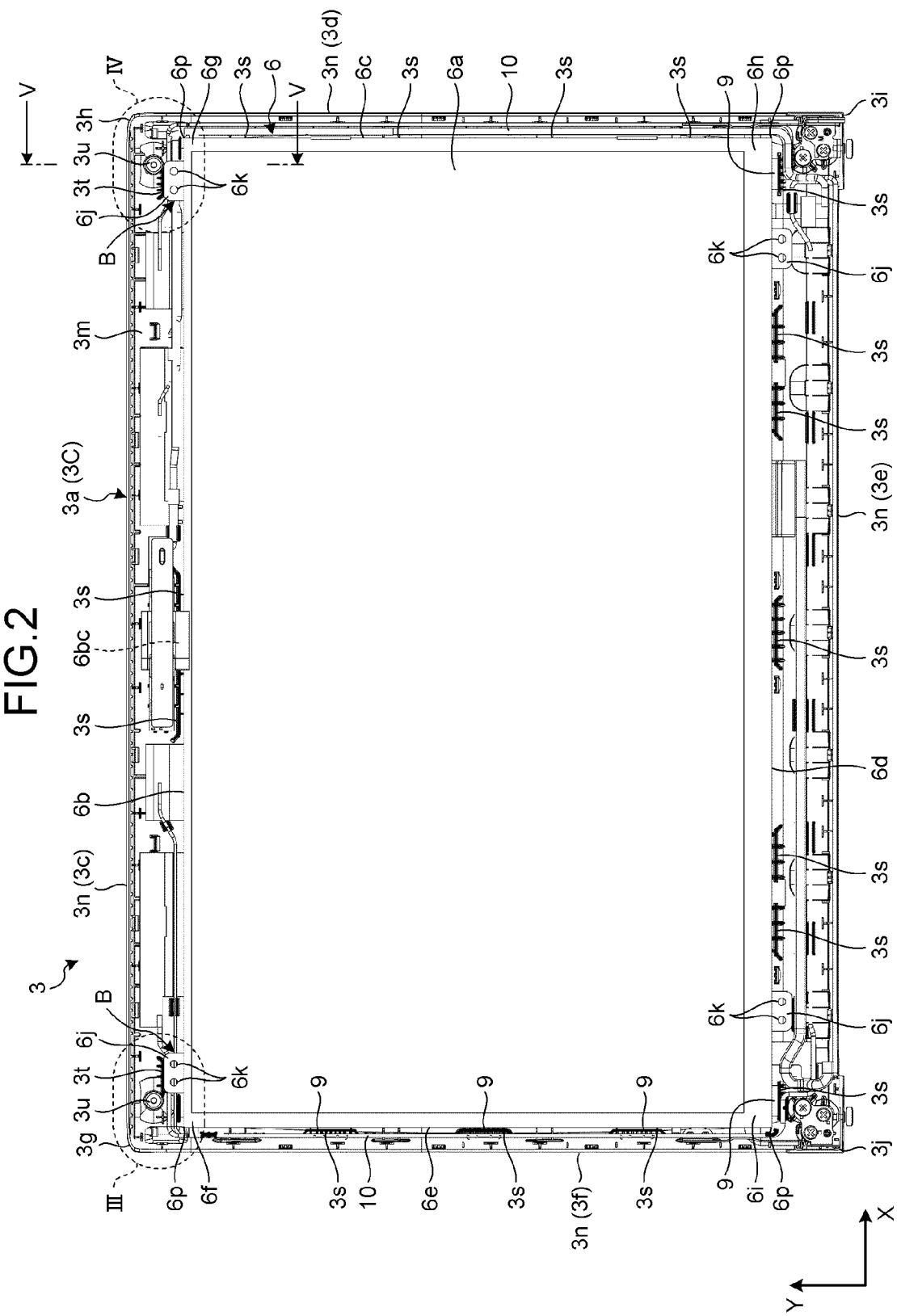
FIG. 2 is an exemplary plan view of the inside a second unit of the electronic device in the first embodiment.

FIG. 2 is a plan view of the inside of the second unit 3 from which a second component 3M (see FIG. 1) is removed. As illustrated in FIGS. 1 and 2, the second unit 3 has the shape of a rectangle long in the X direction and short in the Y direction in a plan view from the Z direction. The second unit 3 is thin and flat in the Z direction. The housing 3a of the second unit 3 has four sides 3c to 3f and four corners 3g to 3j. The housing 3a comprises a first component 3C and the second component 3M. The first component 3C has a bottom wall 3m forming a back surface 3k and a side wall 3n (circumferential wall, standing wall) extending at the periphery of the bottom wall 3m. The second component 3M has a top wall 3p forming the front surface 3b and the side wall (circumferential wall, not illustrated) extending at the periphery of the top wall 3p. A rectangular opening 3r is formed in the center of the front surface 3b (the top wall 3p) of the second component 3M. The display screen 6a of the display panel 6 is exposed from the opening 3r. In the first embodiment, the side wall 3n of the first component 3C provides the sides 3c to 3f and the corners 3g to 3j. Besides, walls such as the bottom wall 3m, the top wall 3p, and the side wall 3n define the outline of the housing 3a of the second unit 3. In the first embodiment, the bottom wall 3m corresponds to a first wall that extends along a direction crossing a direction (the Z direction) perpendicular to the display screen 6a. Meanwhile, the top wall 3p is an example of a second wall that is located spaced apart from the bottom wall 3m as the first wall and extends along a direction crossing a direction perpendicular to the display screen 6a. The housing 3a may be made of a metal material, a synthetic resin material, and the like.

As illustrated in FIG. 2, the display panel 6 has the shape of a rectangle long in the X direction and short in the Y direction in a plan view from the Z direction. The display panel 6 is thin and flat in the Z direction. The display panel 6 has four sides 6b to 6e and four corners 6f to 6i. The display panel 6 is located substantially in the center of the first component 3C.

The display panel 6 of the first embodiment is not fixed to the housing 3a by a fastener such as a screw or the like but is displaceably supported via elastic members 9. More specifically, in the X direction, the display panel 6 is supported as being sandwiched between a plurality of wall-like ribs as protrusions 3s provided to any of the walls of the housing 3a (in the first embodiment, for example, the bottom wall 3m) via the elastic members 9 made of sponge, rubber, or the like. In the Y direction, the display panel 6 is supported as being sandwiched between a plurality of wall-like ribs as the protrusions 3s provided to any of the walls of the housing 3a (in the first embodiment, for example, the bottom wall 3m) via the elastic members 9 made of sponge, rubber, or the like. In the Z direction, the display panel 6 is supported as being sandwiched between some of the walls of the housing 3a (in the first embodiment, for example, the top wall 3p and the bottom wall 3m) via elastic members made of sponge, rubber, or the like (not illustrated). However, to prevent vibration, noise, and the like in the normal use state, the display panel 6 is relatively firmly supported by the housing 3a. With respect to all the X, Y, and Z directions, the elastic members 9 maybe arranged on one or both sides of the display panel 6 in each direction. The protrusions 3s are an example of supporting members to support the display panel 6.

The electronic device 1 of the first embodiment comprises a shock absorbing mechanism to absorb a shock acting on the display panel 6 when the electronic device 1 falls. First, the elastic members 9 having received a load (a shock load) in the X direction from the display panel 6 are elastically deformed, and the ribs as the protrusions 3s subjected to weight bearing are plastically deformed in such a manner as lying down. Since the deformation spends energy, the shock to the display panel 6 can be reduced.

With respect to the absorption of a shock mainly in the Y direction, in the first embodiment, the display panel 6a is provided with a protrusion 6j having a buffer B. In the first embodiment, for example, the buffer B is a narrow portion provided with through holes 6k. In other words, the buffer B is provided as a stress concentration portion on which stress is concentrated because of the through holes 6k. On the other hand, the housing 3a is provided with an engagement portion 3t that engages with the protrusion 6j in at least the Y direction. In the first embodiment, for example, the engagement portion 3t is provided as a wall-like rib protruding from any of the walls of the housing 3a (in the first embodiment, for example, the bottom wall 3m). With this structure, if the display panel 6 receives a load in the Y direction (upward direction in FIG. 2), the protrusion 6j comes in contact with the engagement portion 3t and engages therewith. Accordingly, the protrusion 6j is sandwiched between the engagement portion 3t and a wall of the display panel 6 (in the first embodiment, for example, a side wall 6m and a bottom wall 6n (see FIG. 5)), and is subjected to a compressive load. Due to the compressive load, the buffer B is deformed (plastically deformed), for example, bent, and the protrusion 6j is buckled. Since the deformation spends energy, the shock to the display panel 6 can be reduced. Incidentally, the engagement portion 3t is an example of a supporting member that supports the protrusion 6j in contact therewith.

The protrusion 6j is located at a position different from where the protrusions 3s as supporting members support the display panel 6 on the side 6b of the display panel 6. More specifically, in the first embodiment, the protrusion 6j is located at a position on the side 6b of the display panel 6 closer to each of the corners 6f and 6g than to a center 6bc (in the first embodiment, for example, around the corners 6f and 6g). It is often the case that the housing 3a falls from any of the corners 3g to 3j, i.e., with any of the corners 3g to 3j down. If the electronic device 1 falls from the corner 6f or 6g, i.e., with the corner 6f or 6g down, the load applied to the corner 6f or 6g of the display panel 6 is heavier than the load applied from the housing 3a to the center 6bc of the side 6b of the display panel 6. Regarding this, according to the first embodiment, the buffer B (the protrusion 6j) is located at a position on the side 6b of the display panel 6 closer to each of the corners 6f or 6g than to the center 6bc (in the first embodiment, for example, around the corners 6f and 6g). Thus, the shock can be effectively absorbed.

According to the first embodiment, the protrusion 6j provided with the buffer B is located at a position separated from ends 6p of the corners 6f and 6g. If the display panel 6 comprises a rectangular fragile constituent element (for example, a glass plate, etc.), as the position where a load is applied to the constituent element is closer to the corners 6f and 6g, the constituent element (especially, the corners 6f and 6g) is more likely to be damaged. Regarding this, in the first embodiment, the protrusion 6j is located at a position separated from the corners 6f and 6g of the display panel 6. This reduces damage to the display panel 6.

According to the first embodiment, the protrusions 3s as supporting members support the display panel 6 at positions closer to the center 6bc (in the first embodiment, for example, the center 6bc) than to the corners 6f and 6g of the side 6b of the display panel 6. Since the display panel 6 is supported at positions closer to the center 6bc than to the corners 6f and 6g, the display panel 6 tends to displace (incline) in a direction along the display screen 6a compared to the case where it is supported at positions closer to the corners 6f and 6g. Thus, if the display panel 6 falls with any one of the corners 6f and 6g at both ends of the side 6b down, the protrusion 6j, which is located close to each of the corners 6f and 6g on down side, easily engages with the engagement portion 3t. With this, it is possible to achieve a buffering effect by the deformation of the buffer B more effectively. That is, in the first embodiment, the buffer B is located close to each of the corners 6f and 6g at both ends of the side 6b, and supporting members that support the display panel 6 are located at positions other than the positions of the corners 6f and 6g. Thus, the buffering effect of the buffer B can be improved, and the buffer B and the protrusions 3s as supporting members can be efficiently laid out.

Figure 3:
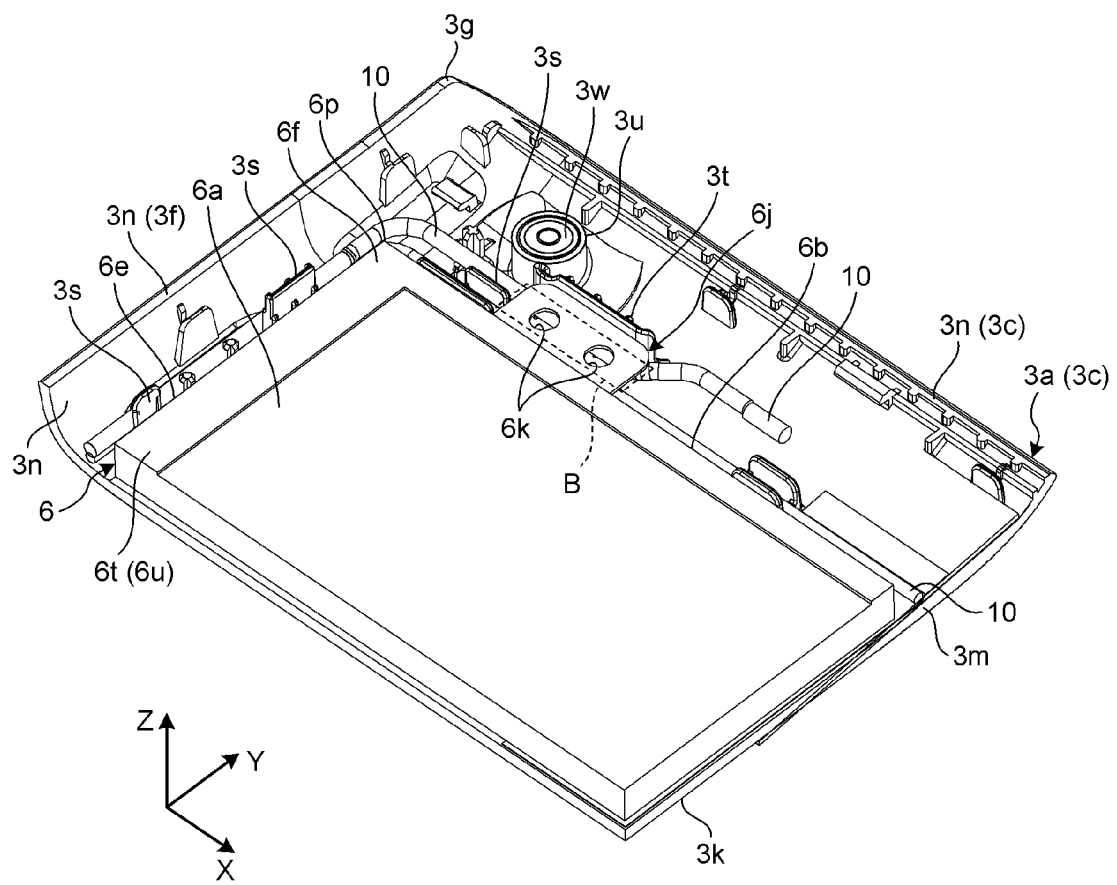
FIG. 3 is an exemplary perspective view of a part of the inside of the second unit of the electronic device (a portion indicated by III in FIG. 2) in the first embodiment.
Figure 4:
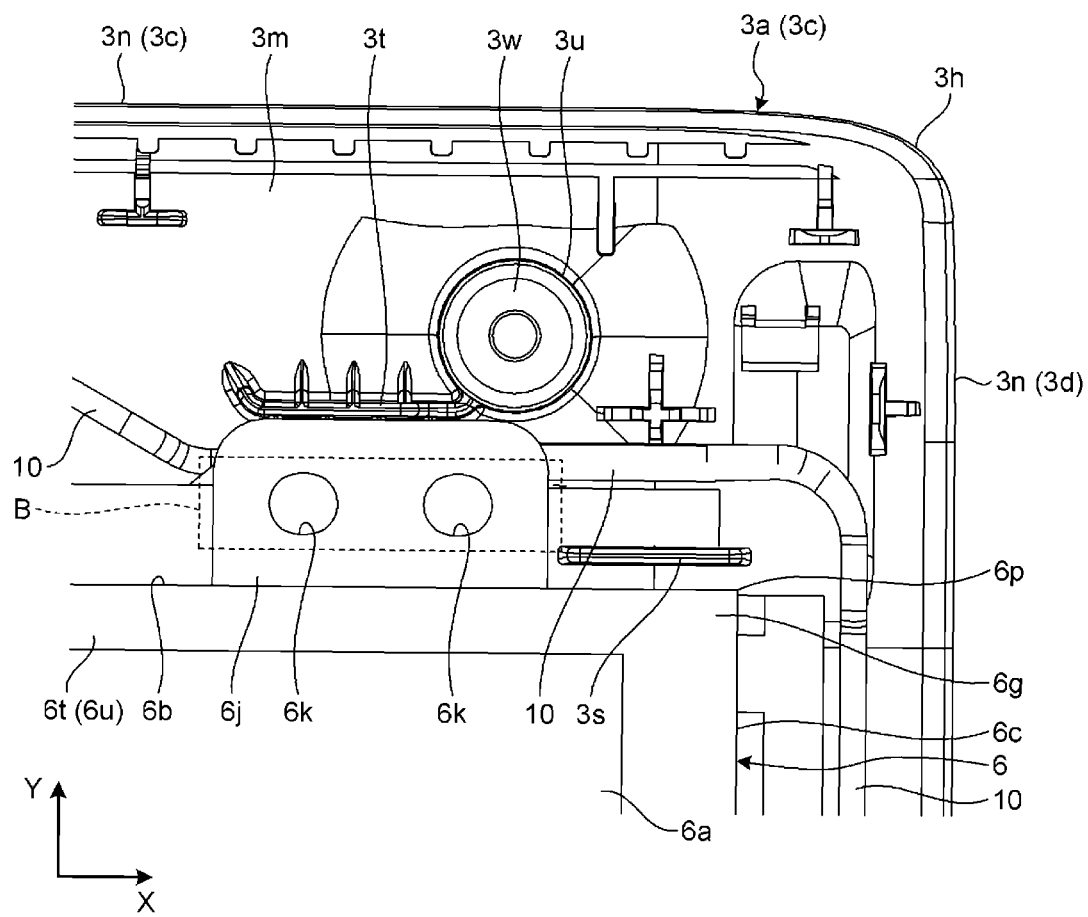
FIG. 4 is an exemplary plan view of another part of the inside of the second unit of the electronic device (a portion indicated by IV in FIG. 2) in the first embodiment.

As illustrated in FIGS. 3 and 4, according to the embodiment, the engagement portion 3t is connected to a protrusion 3u provided to any of the walls of the housing 3a (in the first embodiment, for example, the bottom wall 3m). In other words, the engagement portion 3t is integrated with the protrusion 3u. The protrusion 3u is formed as a fixation portion to which is fixed a fastener such as a screw (not illustrated) that connects the first component 3C and the second component 3M of the housing 3a. More specifically, a female screw 3w made of a metal or the like is formed by insert molding in the columnar (cylindrical) protrusion 3u made of resin or the like. The female screw 3w is provided with a female screw hole into which a screw as a fastener is threaded. In this manner, in the first embodiment, the engagement portion 3t is integrated with the protrusion 3u, which increases the rigidity of the engagement portion 3t. Thus, the buffer B can be easily deformed, and it is possible to achieve a buffering effect by the deformation of the buffer B more effectively. Besides, at a portion illustrated in FIG. 4, the protrusion 3u also functions as the engagement portion 3t. With this structure, it is possible to achieve a buffering effect by the deformation of the buffer B even more effectively.

Figure 5:
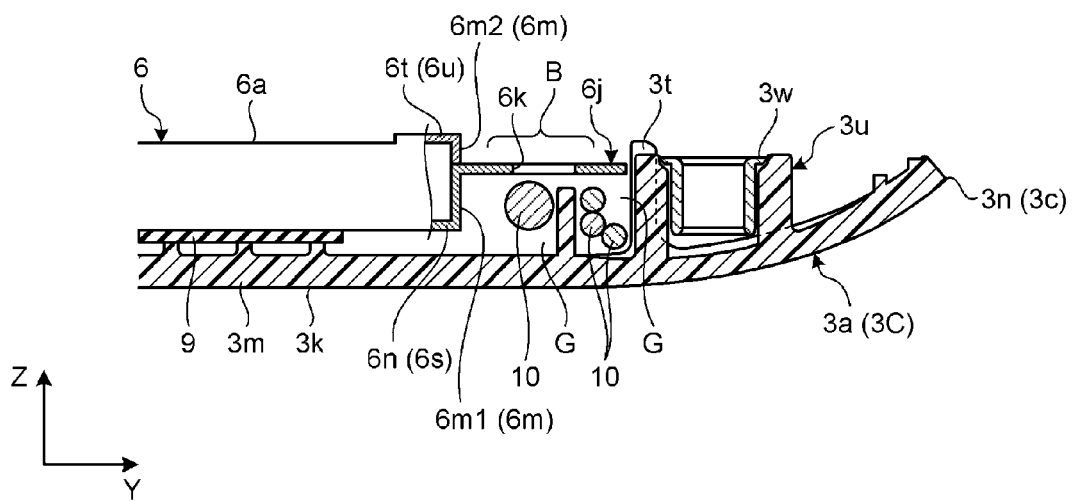
FIG. 5 is an exemplary cross-sectional view taken along line V-V of FIG. 2 in the first embodiment.

As illustrated in FIG. 5, the protrusion 6j protrudes at a position separated from the display screen 6a (a position separated downward in FIG. 5) in a direction (the Z direction) perpendicular to the display screen 6a of the display panel 6. As the protrusion 6j is closer to the display screen 6a, the load applied to the display panel 6 through the protrusion 6j is more likely to act on a fragile component located on the display screen 6a side (for example, a glass plate, etc., not illustrated). Regarding this, in the first embodiment, the protrusion 6j protrudes at a position separated from the display screen 6a in a direction (the Z direction) perpendicular to the display screen 6a. This reduces damage to the display panel 6.

According to the first embodiment, as illustrated in FIG. 5, the display panel 6 comprises, as the housing, a first component 6s including the bottom wall 6n and a lower portion 6m1 of the side wall 6m and a second component 6u including a top wall 6t and an upper portion 6m2 of the side wall 6m. The protrusion 6j is provided to the first component 6s including the bottom wall 6n. Thus, it is possible to suppress the load applied to the display panel 6 through the protrusion 6j from acting through the top wall 6t on a fragile component located on the display screen 6a side (for example, a glass plate, etc., not illustrated).

According to the first embodiment, as illustrated in FIG. 5, there is provided a gap G between the protrusion 6j and the bottom wall 3m of the housing 3a, and a wiring 10 is located in the gap G. That is, in the first embodiment, the wiring 10 is covered with the protrusion 6j. This suppresses the wiring 10 from shifting from a predetermined position. The wiring 10 may be, for example, an antenna harness, a camera harness, or the like.

As described above, according to the first embodiment, the electronic device 1 has a structure in which the engagement portion 3t (supporting member) provided to the housing 3a engages with the protrusion 6j provided to the display panel 6 as a display module. The protrusion 6j is provided with the buffer B. Thus, the shock of the falling of the electronic device 1 or the like can be absorbed by the deformation (plastic deformation) of the protrusion 6j. Such a structure may be effective if it is difficult to arrange the protrusions 3s and the elastic members 9 or if the deformation of the protrusions 3s and the elastic members 9 cannot sufficiently absorb the shock. Using shock absorption by the protrusion 6j in combination with that of the protrusions 3s and the elastic members 9 can achieve more effective shock absorbing performance.

Figure 6:
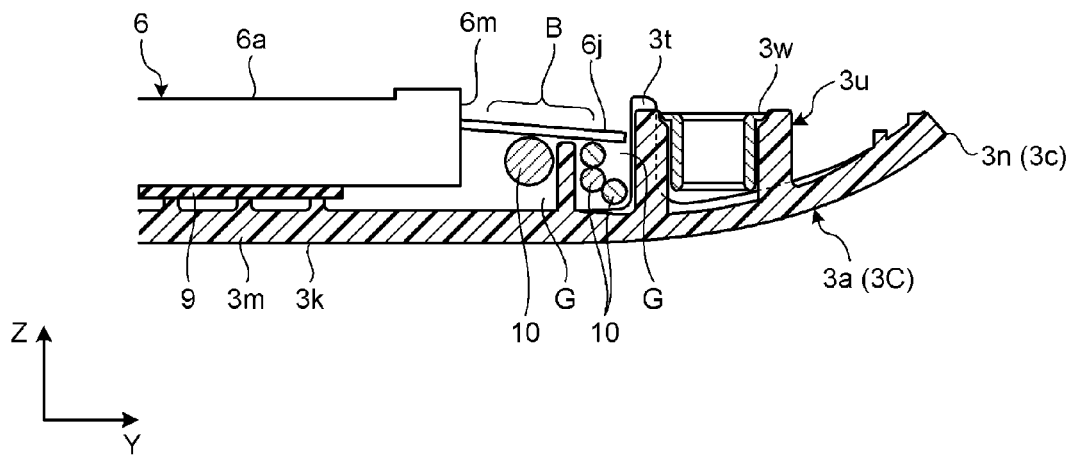
FIG. 6 is an exemplary cross-sectional view taken along line V-V of FIG. 2 according to a first modification of the first embodiment.

FIG. 6 illustrates the structure of a first modification of the first embodiment. The structure of the first modification is basically the same as that of the first embodiment except for the difference in the shape of the protrusion 6j. According to the first modification, the same effect as previously described in the first embodiment can be achieved. In the first modification, the protrusion 6j protrudes at an angle toward the base of the engagement portion 3t formed as a protrusion protruding from the bottom wall 3m (toward the bottom wall 3m). This suppresses the protrusion 6j from escaping without engaging with an end of the engagement portion 3t. Thus, the protrusion 6j is more reliably engaged with the engagement portion 3t. Moreover, the protrusion 6j is easily bent at the base, which makes it easier to achieve a buffering effect by the deformation of the protrusion 6j as the buffer B.

Figure 7:
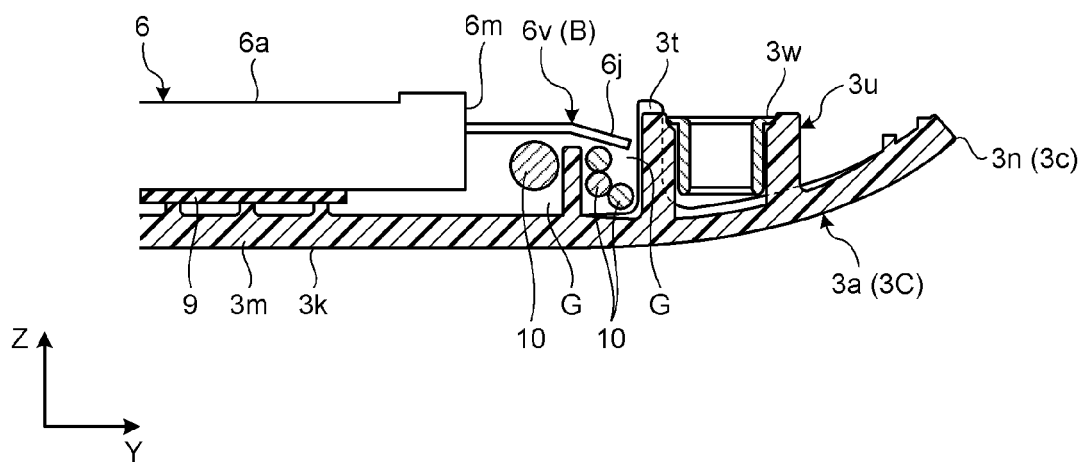
FIG. 7 is an exemplary cross-sectional view taken along line V-V of FIG. 2 according to a second modification of the first embodiment.

FIG. 7 illustrates the structure of a second modification of the first embodiment. The structure of the second modification is basically the same as that of the first embodiment except for the difference in the shape of the protrusion 6j. According to the second modification, the same effect as previously described in the first embodiment can be achieved. In the second modification, the protrusion 6j is provided with a bent portion 6v that functions as the buffer B. More specifically, the protrusion 6j is bent in a V-shape pointing toward opposite side of the bottom wall 3m to form the bent portion 6v. Accordingly, when a compressive load acts on the protrusion 6j, an end of the protrusion 6j moves toward the base of the engagement portion 3t. Thus, the protrusion 6j is more reliably engaged with the engagement portion 3t.

Figure 8:
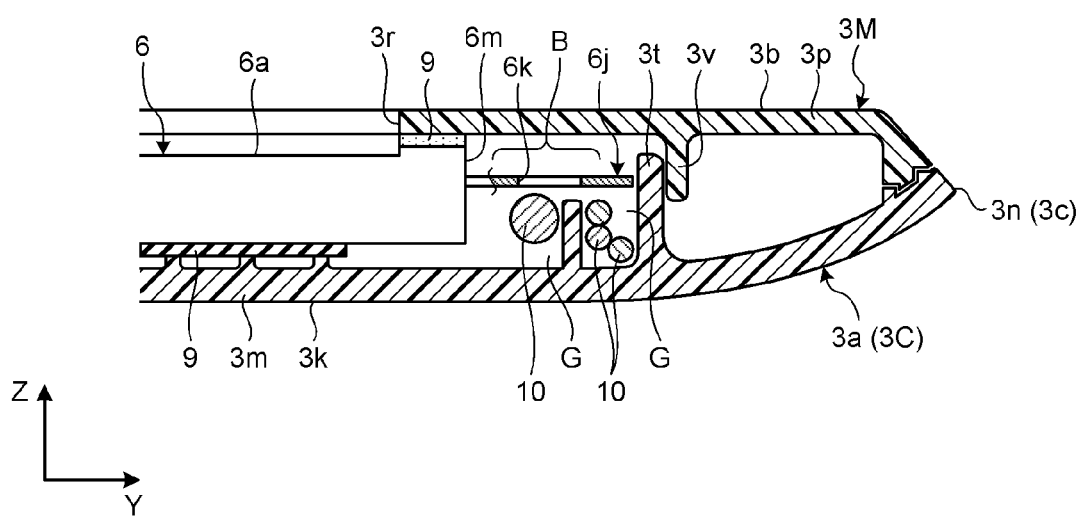
FIG. 8 is an exemplary cross-sectional view of a second unit of an electronic device according to a second embodiment.

FIG. 8 illustrates the structure of a second embodiment. The structure of the second embodiment is basically the same as that of the first embodiment except for the presence of a second engagement portion 3v configured to engage with the engagement portion 3t. According to the second embodiment, the same effect as previously described in the first embodiment can be achieved. In the second embodiment, the second engagement portion 3v provided to the top wall 3p is located opposite the display panel 6 with respect to the engagement portion 3t provided to the bottom wall 3m. Accordingly, if a relatively heavy load acts on the engagement portion 3t from the protrusion 6j, the second engagement portion 3v prevents the engagement portion 3t from lying down. Thus, it is possible to prevent the engagement portion 3t coming in contact with the protrusion 6j from lying down and thereby to prevent the buffering effect by the deformation of the buffer B from becoming difficult to achieve.

Figure 9:
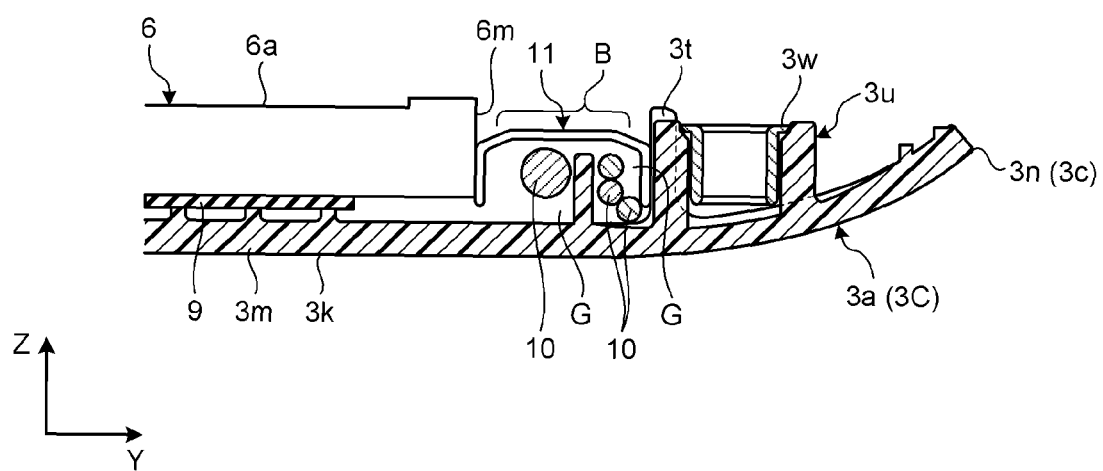
FIG. 9 is an exemplary cross-sectional view of a second unit of an electronic device according to a third embodiment.

FIG. 9 illustrates the structure of a third embodiment. The structure of the third embodiment is basically the same as that of the first embodiment except for the presence of a buffering member 11 as the buffer B in place of the protrusion 6j having the buffer B. According to the third embodiment, the same effect as previously described in the first embodiment can be achieved. In the third embodiment, as is separate from the display panel 6 as a display module, there is provided the buffering member 11 that is plastically deformed by a compressive load acting between the display panel 6 and the engagement portion 3t. The buffering member 11 of the third embodiment is, for example, formed of a plate made of a metal or the like. The buffering member 11 is bent in a convex shape toward the distal end of the engagement portion 3t formed as a protrusion protruding from the bottom wall 3m. Accordingly, when a compressive load acts between the display panel 6 and the engagement portion 3t, the buffering member 11 is deformed (elastically and plastically deformed), thereby absorbing the shock. Besides, the buffering member 11 is convex toward the distal end of the engagement portion 3t, when the buffering member 11 is bent, ends of the buffering member 11 moves toward the base side of the engagement portion 3t. Thus, the display panel 6 is more reliably engaged with the engagement portion 3t through the buffering member 11. Preferably, the buffering member 11 is located at a position of the protrusion 6j described in the first embodiment.

While the above embodiments are described as being applied to a PC, they may also be applied to other electronic devices. For example, the above embodiments may also be applied to an electronic device having a component such as a display module other than LCD. Further, the structure of the protrusion and the buffer can be variously modified. For example, the buffer can be formed of a thin portion having less thickness such as a notch or a groove. The number and shape of the through holes and notches that form the buffer can be also modified as required. The engagement portion may be provided to the top wall or the side wall, and the second engagement portion may be provided to the bottom wall. Besides, regarding the display module, the protrusion, the wall, the engagement portion, the buffer, the side, the corner, the supporting member, the first wall, the second wall, the first component, the second component, the fixation portion, and the like, the specifications (form, structure, location, shape, number, size, thickness, material, etc.) can be suitably modified. The above embodiments and the modifications thereof can be implemented in combination as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a display module comprising a rectangular shape and comprising a display screen, a side portion at a periphery of the display screen, and a protrusion on the side portion, the protrusion being located at a position closer to a corner than to a center portion of a side portion comprising a long side of the display module of the side portion;
a housing configured to house the display module with the display screen exposed; and
a supporting member protruding from an inner surface of the housing in a direction crossing a protruding direction of the protrusion, the supporting member contracting the protrusion,
wherein the display module is not fixed to the housing with a screw and is displaceably supported in the housing, and
the protrusion comprises a portion configured to be deformed between the display module and the supporting member when the display module is displaced.

2. The electronic device of claim 1, wherein
the protrusion is closer to the corner.

3. The electronic device of claim 2, wherein the protrusion is separate from an end of the corner.

4. The electronic device of claim 2, the housing further comprising a second supporting member configured to support the side portion, the second supporting member closer to a center of the side portion than the protrusion.

5. The electronic device of claim 1, wherein the protrusion protrudes at a position separated from the display screen along an axis perpendicular to the display screen.

6. The electronic device of claim 1, further comprising:
a first wall of the housing extending along a direction crossing a direction perpendicular to the display screen;
a second wall of the housing spaced apart from the first wall along a direction crossing a direction perpendicular to the display screen; and
an engagement portion of the housing, the engagement portion configured to engage with the supporting member,
wherein the supporting member is provided at one of the first wall and the second wall, and
the engagement portion is provided at the other of the first wall and the second wall.

7. The electronic device of claim 1, wherein the supporting member is integrated with a fixation portion to which a component is fixed by a fastener.

8. An electronic device comprising:
a display module comprising a rectangular shape comprising a corner and a long side and comprising a protrusion protruding to a side direction from a position near the corner of the long side;
a housing configured to house the display module; and
a supporting member configured to protrude from an inner surface of the housing in a direction crossing the protrusion and contact the protrusion,
wherein the display module is not fixed to the housing with a screw and is displaceably supported in the housing, and
the protrusion comprises a portion configured to be deformed by a compressive load acting between the display module and the supporting member when the display module is displaced.

9. The electronic device of claim 8, further comprising a second supporting member configured to protrude from an inner surface of the housing closer to a center of the side portion which is a longer side of the display module than to the supporting member and support the side portion.

10. An electronic device comprising:
a housing;
a display module comprising a rectangular shape comprising a corner and a long side and comprising a protrusion protruding to a side direction from a position near the corner of the long side, the display, the display module being configured to be displaceably supported within the housing without being fixed to the housing with a screw; and
a supporting member provided at the housing and configured to contact the protrusion,
wherein the protrusion comprises a portion which is deformed by a compressive load acting between the display module and the supporting member when the display module is displaced.

* * * * *